Jan. 18, 1955  B. D. McINTYRE  2,699,844
SHOCK ABSORBER CONSTRUCTION
Filed March 14, 1950

INVENTOR.
Brouwer D. McIntyre.
BY
Harness, Dickey & Pierce.
ATTORNEYS.

United States Patent Office 2,699,844
Patented Jan. 18, 1955

2,699,844

SHOCK ABSORBER CONSTRUCTION

Brouwer D. McIntyre, Monroe, Mich., assignor to Patent Development Company, Monroe, Mich., a partnership Application March 14, 1950, Serial No. 149,476

3 Claims. (Cl. 188—88)

This invention relates generally to hydraulic, direct-acting shock absorbers, and more particularly to improved piston and base valve constructions for such shock absorbers.

It is an object of this invention to provide shock absorber piston and base valve constructions having valve means associated therewith for controlling the flow of fluid through each in one direction, which valve means provide relatively light control or resistance to the flow of fluid past the piston and base valve at relatively low piston velocities and fluid pressures, and increasingly higher resistance and control as the piston velocities and fluid pressures increase, so as to provide efficient shock absorber control at all times.

It is a still further object of this invention to provide a piston construction for shock absorbers of the aforementioned type, which will eliminate or materially reduce harshness in vehicle riding characteristics for vehicles on which the shock absorber is mounted, and which will not, even though providing increased control at higher piston velocities and fluid pressures, impart any harshness to the shock absorber action or vehicle ride.

It is a still further object of this invention to provide a hydraulic shock absorber of the aforementioned type, which is relatively simple and inexpensive in construction, durable in operation and extremely efficient in providing the proper shock absorber control in the desired manner.

These and other objects of this invention will become apparent from the following detailed description, taken in conjunction with the accompanying drawing, in which.

Figure 1:
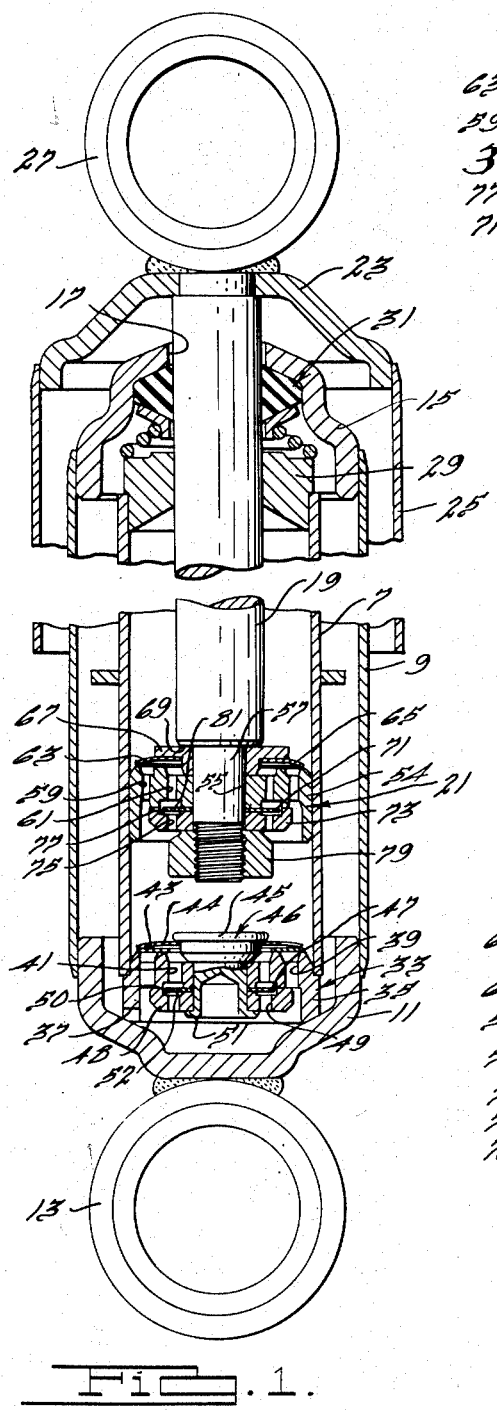
Figure 1 is a longitudinal sectional view of a shock absorber incorporating the piston construction of this invention.
Figure 2:
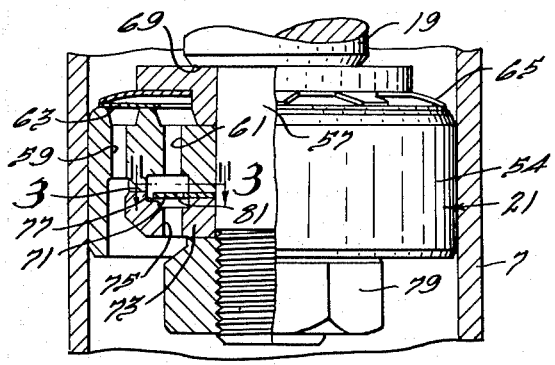
Fig. 2 is an enlarged fragmentary view, partially in section and partially in elevation, of the piston construction and adjacent parts of the shock absorber illustrated in Fig. 1.
Figure 3:
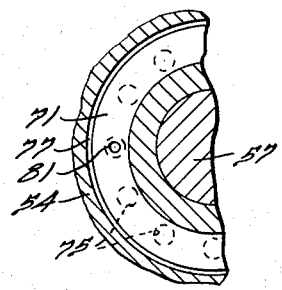
Fig. 3 is a fragmentary sectional view of the structure illustrated in Fig. 2, taken along the line 3—3 thereof.
Figure 4:
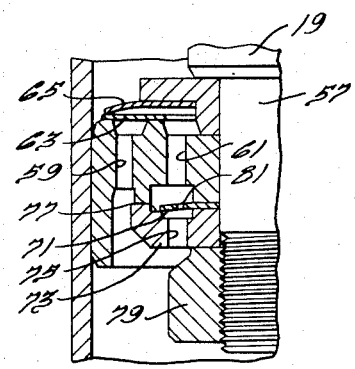
Fig. 4 is a fragmentary sectional view, similar to Fig. 2, and illustrating the piston rebound control disk in its actuated or closed position.

While the piston and base valve constructions of this invention may be used in various types of shock absorber constructions, and need not necessarily be used together, they are illustrated in conjunction with a hydraulic, direct-acting, tubular shock absorber of the type shown, which includes a tubular member 7, forming the pressure cylinder of the shock absorber, and a second tubular member 9, surrounding the first tubular member and cooperating therewith to form a reserve chamber. The lower end of the tubular member 9 is closed by means of an end cap 11, having an attaching ring 13 connected therewith for securing one end of the shock absorber to a portion of a vehicle or the like. The upper end of the tube 9 is closed by means of an end cap 15, which has its base portion apertured at 17 to slidably receive a piston rod 19, the lower end of which is connected with a piston 21. The upper end of the piston rod 19, beyond the end cap 15, projects through an end cap 23, which in turn has a depending tube 25 connected therewith, which is concentric with the tubes 7 and 9, and act as a shield therefor. An attaching ring 27 is connected with the upper end of the piston rod and the base portion end of the cap 23, and is adapted to be connected with another part of a vehicle, or the like, so that the piston, piston rod and attaching ring 27 are movable axially of the tubes 7 and 9 and the attaching ring 13.

The upper end of the pressure tube 7 is closed by means of a piston rod guide member 29, and a piston rod seal assembly 31 is disposed between the rod guide 29 and the end cap 15. The lower end of the pressure tube 7 is closed by means of a base valve assembly 33, which includes a valve body 35, the lower end of which engages the end cap 11 and is suitably notched or recessed at 37 to permit fluid to flow between the reserve chamber and the pressure cylinder. The base valve body 35 is provided with an outer set of circumferentially spaced passageways 39 and an inner set of circumferentially spaced passageways 41. The upper ends of the passageways 39 are normally closed against a flow of fluid therethrough by means of a disk 43, which is yieldably held in engagement with the valve body 35 by means of a star spring 44. The star spring is loaded by means of a head portion 45 of a rivet 46, which extends through a central aperture in the valve body 35. The disk 43 is adapted to be actuated by relatively light fluid pressure, so that fluid may quite readily flow from the reserve chamber into the lower portion of the pressure cylinder, as will hereinafter appear.

A flexible disk 47 engages the underside of the central portion of the valve body 35 so as to normally be disposed below the lower ends of the passageways 41. An annular member 48 is sleeved on the lower end of the rivet 46 and retains the inner peripheral portion of the disk 47 in engagement with the underside of the valve body 35. The member 48 is provided with a plurality of circumferentially spaced apertures 49 disposed below the passageways 41 of the valve body 35. The member 48 has a recessed annular valve seat 50 adjacent its upper surface, and the outer peripheral portion of the disk 47 overlies the apertures 49 and is normally disposed above the valve seat 50. The outer peripheral portion of the member 48 engages the underside of the valve body 35 so as to prevent a flow of fluid therebetween. The member 48 is held in its aforementioned position by a spun-over flange 51 formed on the lower end of the rivet 46. The disk 47 is provided with one or more orifices 52 disposed above the apertures 49, through which fluid can flow, even after the disk 47 is deflected downwardly into engagement with valve seat 50, by fluid under pressure flowing downwardly through the passageways 41. The disk 47 and its orifice provides the primary compression control for the shock absorber, as hereinafter will more fully appear.

The piston 21 is provided with a central aperture 55 therethrough, through which the reduced lower end 57 of the piston rod 19 extends. The piston body 54 includes an outer set of circumferentially spaced passageways 59 and an inner set of circumferentially spaced passageways 61. The upper ends of the passageways 59 are normally closed by a disk 63, which is yieldably held in engagement with the upper face of the piston body 54 by means of a star spring 65. The star spring is loaded by means of a spacer washer 67, which is disposed between the upper face of the piston body 54 and a shoulder 69, at the upper end of the piston rod reduced portion 57. The disk 63 permits a flow of fluid upwardly through the passageways 59, so as to maintain the upper portion of the cylinder completely filled with fluid at all times.

A flexible disk 71 engages the under side of the central portion of the piston body 54 so as to normally be disposed below the lower ends of the passageways 61. An annular member 73 is sleeved on the lower reduced end 57 of the piston rod 19 and retains the inner peripheral portion of the disk in engagement with the under side of the piston body 54. The member 73 is provided with a plurality of circumferentially spaced apertures 75, disposed below the passageways 61 of the piston body 54. The member 73 has a recessed annular valve seat 77, adjacent its upper surface and the outer peripheral portion of the disk 71 overlies the apertures 75 and is normally disposed above the valve seat 77. The outer peripheral portion of member 73 engages the under side of the piston body 54 so as to prevent a flow of fluid therebetween. The member 73, as well as the piston 21, is held on the piston rod lower end by means of a nut member 79, which is threaded on the lower end of the piston rod. The disk 71 is provided with one or more orifices 81 disposed above apertures 75.

When the piston 21 moves downwardly in the pressure cylinder, hydraulic fluid in the lower portion of the cylinder will flow upwardly through the piston passageways 59 and past the disk 63, so as to maintain the upper portion of the pressure cylinder completely filled with fluid at all times. Excess fluid caused by displacement of the piston rod 19, will flow downwardly through the base valve passageways 41, and at relatively low fluid velocities and pressures, around the disk 47 as well as through the disk orifice 52, and then through the apertures 49 in the member 48 into the reserve chamber. Thus, at relatively low piston velocities and fluid pressures, relatively light control or resistance to the flow of fluid from the lower portion of the pressure cylinder to the reserve chamber will be provided. However, as the fluid pressure and velocity increases, the disk 47 will gradually be deflected downwardly until at a predetermined fluid pressure or velocity the disk will be seated on the valve seat 50 of the member 48. Thus, the fluid can flow from the pressure cylinder to the reserve chamber only through the orifice 52 in the disk 47. This is of course a restricted flow, and therefore the shock absorber resistance or compression control is materially increased at higher fluid pressures and velocities.

On the rebound stroke of the shock absorber, or upon upward movement of the piston 21, the lower portion of the pressure cylinder will be replenished by fluid flowing from the reserve chamber through the base valve passageways 59 and past the disk 43. Fluid in the upper portion of the pressure cylinder will flow downwardly through the piston passageways 61, and at relatively low piston velocities and low fluid pressures, around the disk 71, as well as through the disk orifice 81, and through passageways 75 in member 73 into the lower portion of the pressure cylinder. It will thus be seen that at relatively low piston velocities and fluid pressures, relatively light control or small resistance to the flow of fluid from the upper side of the pressure cylinder to the lower side thereof will be provided. However, as the piston velocity and fluid pressure increases, the disk 71 will gradually be deflected downwardly until at a predetermined fluid pressure or piston velocity the disk will be seated on the valve seat 77 of member 73. Thus, fluid can flow from the upper portion of the pressure cylinder to the lower portion thereof, only through the orifice 81 in the disk 77. This flow is, of course, a restricted flow, and therefore resistance or rebound control is materially increased in the shock absorber at higher piston velocities and fluid pressures.

The piston and base valve constructions, therefore, provide desirable shock absorber control at both high and low fluid velocities and pressures, so that the shock absorber will not be overcontrolled during low fluid velocities and pressures, nor undercontrolled at high fluid velocities and pressures. This variable shock absorber control materially enhances the riding characteristics of a vehicle on which the shock absorber is mounted, and provides maximum riding comfort on all types of road surfaces. For example, if a vehicle is moving over a relatively smooth surface, such as a boulevard or the like, relatively low piston velocities will occur and relatively light control is desired and obtained, as previously brought out, so as not to impart harshness to the vehicle ride. However, when the vehicle is moving over irregular road surfaces, such as a "washboard" road or the like, relatively high piston velocities will occur and the shock absorber resistance or control is materially increased, as previously brought out, so as to more effectively control the compression and rebound of the vehicle springs and therefore provide a smoother vehicle ride under these conditions. However, even at high piston velocities, the shock absorber will not impart harshness to the vehicle ride, due to the provision of the orifices 81 and 52 in the disks 71 and 47, respectively. While the flow through the orifices is restricted, it is sufficient to allow at least a predetermined amount of fluid to flow from one side to the other of the valve bodies, so as not to adversely affect the vehicle ride.

What is claimed is:

1. A hydraulic shock absorber including a pressure cylinder and a reserve chamber, a piston assembly slidably disposed in said pressure cylinder, means closing one end of said pressure cylinder, a piston rod connected with said piston assembly and having one end thereof extending through said pressure cylinder closing means, a base valve assembly closing the opposite end of said pressure cylinder and communicating with said reserve chamber, said piston assembly including a body having a passageway therein through which fluid may flow from the portion of said pressure cylinder between said piston assembly and said pressure cylinder closing means to the opposite side of said piston assembly, means providing a valve seat adjacent one end of said passageway, a valve for controlling the flow of fluid through said passageway in said direction, said valve being normally out of engagement with said valve seat and normally permitting a flow of fluid through said passageway in said direction, said valve having an orifice therein permitting a restricted flow of fluid therethrough and through said body passageway irrespective of the position of said valve, said valve being actuatable by fluid pressure into engagement with said valve seat to prevent a flow of fluid therepast from the one side of said piston assembly to the other side thereof except through said orifice, said base valve assembly including a body having a passageway therein through which fluid may flow from said pressure cylinder to said reserve chamber, said base valve assembly including a body having a passageway therein through which fluid may flow from said pressure cylinder to said reserve chamber, means providing a valve seat adjacent one end of said passageway, a valve for controlling the flow of fluid through said passageway in said one direction, said valve being normally out of engagement with said valve seat and normally permitting a flow of fluid through said passageway in said one direction, said valve having an orifice therein permitting a restricted flow of fluid therethrough and through said passageway irrespective of the position of said valve, said valve being actuatable by fluid pressure into engagement with said valve seat to prevent a flow of fluid therepast from said pressure cylinder to said reserve chamber except through said orifice.

2. A hydraulic shock absorber including a pressure cylinder and a reserve chamber, a piston assembly slidably disposed in said pressure cylinder, means closing one end of said pressure cylinder, a piston rod connected with said piston assembly and having one end thereof extending through said pressure cylinder closing means, a base valve assembly closing the opposite end of said pressure cylinder and communicating with said reserve chamber, said piston assembly including a body having a passageway therein through which fluid may flow from the portion of said pressure cylinder between said piston assembly and said pressure cylinder closing means to the opposite side of said piston assembly, means for controlling the flow of fluid through said passageway in said one direction, including a flexible disk member disposed adjacent said passageway and normally permitting a flow of fluid through said passageway in said one direction, an element enclosing said disk and one end of said passageway, said element having a passageway therein through which fluid flowing through said body passageway may pass, said disk being positioned so as to normally permit a flow of fluid through said element passageway, said disk having an orifice therein permitting a restricted flow of fluid therethrough and through said element passageway irrespective of the position of said disk, said disk being actuatable by fluid under pressure to prevent a flow of fluid therepast and through said element passageway in said one direction except through said orifice, said base valve assembly including a body having a passageway therein through which fluid may flow from said pressure cylinder to said reserve chamber, means for controlling the flow of fluid through said passageway in said one direction, including a flexible disk member disposed adjacent said passageway and normally permitting a flow of fluid through said passageway in said one direction, an element enclosing said disk and one end of said base valve body passageway, said element having a passageway therein through which fluid flowing through said base valve passageway may pass, said disk being positioned so as to normally permit a flow of fluid through said element passageway, said disk having an orifice therein permitting a restricted flow of fluid therethrough and through said element passageway irrespective of the position of said disk, said disk being actuatable by fluid under pressure to prevent a flow of fluid therepast and through said element passageway in said one direction except through said orifice.

3. A shock absorber piston construction including a body having a passageway therein through which fluid may flow from one side of said body to the other side thereof, means for controlling the flow of fluid through said passageway in one direction, including a flexible disk member disposed adjacent said passageway and having the inner peripheral portion thereof engaging said body, an annular element engaging the inner peripheral portion of said disk member so as to retain the same in engagement with said piston body and having its outer peripheral portion engaging said body so as to enclose said disk and prevent a flow of fluid between said element and body, said element having a passageway therein through which fluid flowing through said piston body passageway may pass, the outer peripheral portion of said disk being normally positioned so as to permit a flow of fluid through said piston body passageway and said element passageway and being actuatable by fluid under pressure into substantial sealing engagement with said element, said disk having an orifice therein permitting a restricted flow of fluid therethrough and through said element passageway even after said disk has been actuated and moved into engagement with said element, a piston rod having one end thereof extending through said body and element, and means connected with said piston rod securing said body, element and rod in an assembled relationship.

References Cited in the file of this patent

UNITED STATES PATENTS

| Number | Name | Date |
|---|---|---|
| 891,529 | Dutrieux | June 23, 1908 |
| 1,028,400 | Stanton | June 4, 1912 |
| 1,282,712 | Barrell | Oct. 22, 1918 |
| 1,320,060 | Jenney | Oct. 28, 1919 |
| 1,887,287 | Churchill | Nov. 8, 1932 |
| 1,905,149 | Chryst | Apr. 25, 1933 |
| 1,966,310 | Padgett | July 10, 1934 |
| 2,038,598 | Peo | Apr. 28, 1936 |
| 2,138,513 | Rossman et al. | Nov. 29, 1938 |
| 2,195,205 | Wineman | Mar. 26, 1940 |
| 2,346,275 | Read et al. | Apr. 11, 1944 |
| 2,360,993 | Whisler, Jr. | Oct. 24, 1944 |
| 2,551,749 | Lewton | May 8, 1951 |

FOREIGN PATENTS

| Number | Country | Date |
|---|---|---|
| 551,195 | Germany | May 28, 1932 |
| 329,199 | Italy | Sept. 3, 1935 |